United States Patent
Wang et al.

(10) Patent No.: US 6,732,903 B2
(45) Date of Patent: May 11, 2004

(54) ADJUSTABLE NOZZLE OF STANNIC FURNACE

(75) Inventors: Po-Hung Wang, Taipei Hsien (TW); Chun-Hsiung Chiu, Taoyuan Hsien (TW); Peng-Wei Wang, Kaohsiung (TW); Jung-I Ku, Taipei Hsien (TW); Chia-Hao Wu, Taipei (TW)

(73) Assignee: Asustek Computer, Inc., Taiwan (CN)

( * ) Notice: Subject to any disclaimer, the term of this patent is extended or adjusted under 35 U.S.C. 154(b) by 4 days.

(21) Appl. No.: 10/260,439

(22) Filed: Oct. 1, 2002

(65) Prior Publication Data

US 2003/0116607 A1 Jun. 26, 2003

(30) Foreign Application Priority Data

Dec. 26, 2001 (TW) .................. 90222966 U

(51) Int. Cl.⁷ .................. B23K 1/08; B23K 31/02
(52) U.S. Cl. .................. 228/37; 228/260
(58) Field of Search .................. 228/256–262, 228/33–40, 43

(56) References Cited

U.S. PATENT DOCUMENTS

| | | | | |
|---|---|---|---|---|
| 4,447,001 A | * | 5/1984 | Allen et al. | 228/37 |
| 4,805,832 A | * | 2/1989 | Zen | 228/260 |
| 4,886,201 A | * | 12/1989 | Deambrosio et al. | 228/37 |
| 5,630,542 A | * | 5/1997 | Hendrikx | 228/37 |
| 5,772,101 A | * | 6/1998 | Nishimura et al. | 228/37 |
| 6,513,702 B2 | * | 2/2003 | Mawatari | 228/260 |
| 6,581,818 B1 | * | 6/2003 | Tu | 228/37 |
| 2002/0047039 A1 | * | 4/2002 | Mawatari | 228/260 |
| 2003/0075585 A1 | * | 4/2003 | Wang et al. | 228/37 |
| 2003/0116607 A1 | * | 6/2003 | Wang et al. | 228/37 |
| 2003/0121950 A1 | * | 7/2003 | Tu | 228/37 |

FOREIGN PATENT DOCUMENTS

JP 409323165 A1 * 12/1997

* cited by examiner

*Primary Examiner*—Kiley Stoner
(74) *Attorney, Agent, or Firm*—Birch, Stewart, Kolasch & Birch, LLP

(57) ABSTRACT

An adjustable nozzle of a stannic furnace comprises a nozzle tank which is mounted at the upper portion of a stannic tank of the stannic furnace, a front backflow stopper and a rear backflow stopper which are respectively mounted at the forward area and the backward area inside the nozzle tank to form an opening of the nozzle such that a liquid tin within the stannic tank passes through the nozzle tank and produces a tin wave at the opening of the nozzle. The feature of the adjustable nozzle lies in that the rear backflow stopper is mounted at the backward area inside the nozzle tank by means of a rear combining means which adjusts the altitude of the rear backflow stopper with an altitudinal opening and fixes the rear backflow stopper by a fixing means so as to control the waveform of the tin wave produced by the nozzle of the stannic furnace.

12 Claims, 3 Drawing Sheets

ABLE NOZZLE OF STANNIC FURNACE

FIELD OF THE INVENTION

The present invention relates to a nozzle of a stannic furnace which is applied in tin soldering of circuit boards, more particularly, to an adjustable nozzle of a stannic furnace, the caliber of which can be modified.

BACKGROUND OF THE INVENTION

With the rapid advances in the integrated circuit (IC) packaging technology and the great promotion of operation performance, not only multi-media computers are widely favored by consumers, but also popularization of computers and the related peripheral products are accelerated. However, because of improvements in IC's operation performance, the number of the packaging contact pins of various components is also greatly increased. This leads that the related circuit board layout design becomes more sophisticated and complicated and that the manufacturing processes for plugging and tin soldering of circuit boards meet with considerable difficulties. In current production procedures in assembly of circuit boards, the manufacturing process for tin soldering the contact pins of the components is mainly by means of wave soldering, wherein the molten liquid tin inside the stannic furnace is gushed up by a pump as a long tin wave and when the circuit board is obliquely transported upwardly through the stannic furnace and makes contact with the tin wave, the liquid tin will enter into the holes where the contact pins of the chip are plugged in the circuit board, fill the tin therein, and form weld spots thereon.

Please refer to FIGS. 1A and 1B, which are schematic diagrams of employing a stannic furnace apparatus 10 to proceed with a process for wave soldering a circuit board 12. The stannic furnace apparatus 10 has a stannic tank 14 for carrying the molten liquid tin therein. A motor pump 16 is mounted in one side of the stannic tank 14 and can gush up the liquid tin within the stannic tank 14. Then, the gushed liquid tin forms a tin wave at a nozzle opening 20 above the stannic tank 14. The circuit board 12 is transported by a slanted delivery track 18 to above the top of the stannic tank 14, and the tin wave gushed up from the nozzle opening 20 of the stannic furnace enters into the holes at the circuit board 12 where the contact pins of the components are plugged, fills the tin therein, and forms weld spots thereon so as to complete the soldering process of the components at the contact pins thereof.

Turning to FIG. 2, which is a schematic diagram of a conventional nozzle of the stannic furnace, the molten liquid tin is full contained within the stannic tank 14 of the stannic furnace 10. When the motor pump (not shown) is motivated, the liquid tin is gushed up from a nozzle pedestal 22 within the stannic tank 14 and is guided through a nozzle tank 23 and then forms the tin wave at the nozzle opening 20 above the nozzle tank 23 so as to carry out the wave soldering process. The nozzle tank 23 is a rectangular tank smaller than the stannic tank 14, and a lower guiding channel 24 at the base of the nozzle tank 23 is mounted on the top of the nozzle pedestal 22. A front backflow stopper 25 and a rear backflow stopper 26 are respectively set at the front and the rear inside the nozzle tank 23, and a structure of the nozzle opening 20 is formed between the two backflow stoppers 25 and 26. The liquid tin inside the stannic tank 14 is spouted out of the nozzle opening 20 above the nozzle tank 23 as a tin wave.

However, in the process of wave soldering the circuit board, the contacting period of the circuit board with the tin wave has much effect in the quality of wave soldering. When the circuit board is wave soldered by the tin waves with different waveforms, the contacting periods of the tin waves with the circuit board would also be different, and certainly this leads to variation in the quality of wave soldering. The most important factor which works upon the waveform of the tin wave is design for the nozzle of the stannic furnace since the waveform of the tin wave spouted out from the nozzle opening is altered once the shape of the nozzle changes. For instance, if the distance between the front and rear backflow stoppers is varied, the waveform of the tin wave produced at the nozzle opening will also change; moreover, if the relative position between the front and rear backflow stoppers in height is varied, the angle and waveform of the tin wave spouted out from the nozzle opening will also change. Therefore, the specification for the nozzle of the stannic furnace in the prior art, including the opening or the relative altitudinal position of the front and rear backflow stoppers, usually must be designed based on the requirements of wave soldering such that the produced waveform of the tin wave is able to conform with the requirements of wave soldering for the circuit board. However, the nozzle of the stannic furnace after design completion cannot be altered or adjusted anymore.

The above-mentioned unfavorable situation is mainly resulted from the fact that the conventional nozzle including the nozzle tank and the front and rear backflow stoppers are fixed on the stannic tank, and thus both the dimension of the nozzle opening and the height positions of the front and rear backflow stoppers are not adjustable. Hence, when wave soldering, it is difficult for the nozzle of the stannic furnace in the prior art to produce an appropriate waveform of the tin wave to meet with the actual requirement, and this causes the contacting period of the circuit board with the tin wave not easy to control and then affects the wave soldering quality of the circuit board.

In view of the aforesaid drawbacks, there is a need in the relevant art for an adjustable nozzle of a stannic furnace so as to control the period when the circuit board contacts with the tin wave and thus to enhance the wave soldering quality of the circuit board.

SUMMARY OF THE INVENTION

The primary objective of the present invention is to provide an adjustable nozzle of a stannic furnace. By means of adjustment to the nozzle, an appropriate waveform of the tin wave is produced so as to control the contacting period of the circuit board with the tin wave and the pressure variation of the gushing tin as well as to raise the yield of wave soldering the circuit board.

In one embodiment of this invention, the adjustable nozzle of the stannic furnace comprises a nozzle tank, a front backflow stopper and a rear backflow stopper. A lower guiding groove at the base of the nozzle tank can be linked up with the upper portion of the stannic tank. A rear combining means, which is a bending plate structure is mounted on the backward area inside the base of the nozzle tank. The bending plate is glidingly co-operated with the base of the nozzle tank by means of a horizontal opening. The horizontal opening is a continuous long slot and can be used to adjust the horizontal position of the rear combining means 37 in relation to the base of the nozzle tank and is fixed by a fixing means. The rear combining means is glidingly co-operated with the rear backflow stopper by means of an altitudinal opening. The altitudinal opening is a continuous long slot and can be used to adjust the attitudinal position of the rear combining means in relation to the rear backflow stopper and is fixed by a fixing means. The front backflow stopper is mounted at the forward area inside the nozzle tank. A nozzle opening of the stannic furnace is formed between the front backflow stopper and the rear backflow stopper. After being guided by the nozzle tank, the liquid tin within the stannic tank produces a tin wave at the opening of the nozzle so as to proceed with the tin soldering process.

Since the nozzle of the stannic furnace in the present invention can control the dimension of the nozzle opening by means of adjustment to the location of the rear combining means in the horizontal direction as well as can control the spouting angle of the tin wave by means of adjustment to the altitude of the rear backflow stopper, an appropriate waveform of the tin wave will be produced to control the contacting period of the circuit board with the tin wave and the pressure variation of the gushing tin so as to enhance the quality of wave soldering for the circuit board.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

An adjustable nozzle of a stannic furnace of this invention is disclosed, wherein the opening dimension of the nozzle and the spouting direction thereof are adjusted to produce the best waveform of the tin wave such that the contacting period of the circuit board with the tin wave can be well-controlled when the circuit board passes through the stannic furnace for wave soldering, and thus the wave soldering quality and yield of the circuit board can be enhanced. The detailed description of the present invention is given by the following best mode for illustration.

Figure 1A:
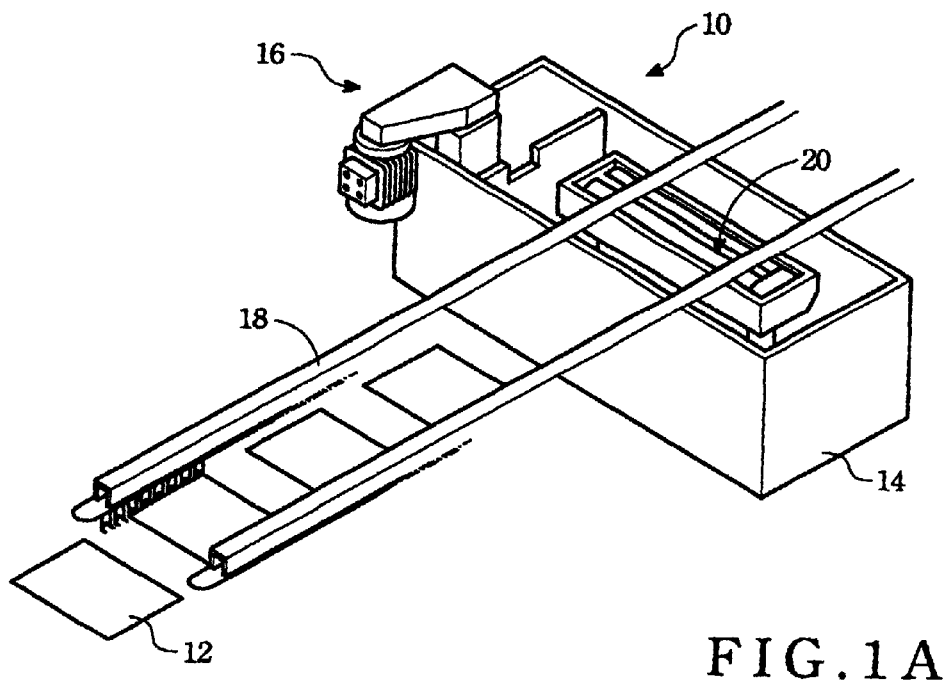
FIGS. 1A and 1B are schematic diagrams of employing a stannic furnace apparatus to proceed with a process for wave soldering a circuit board.
Figure 1B:
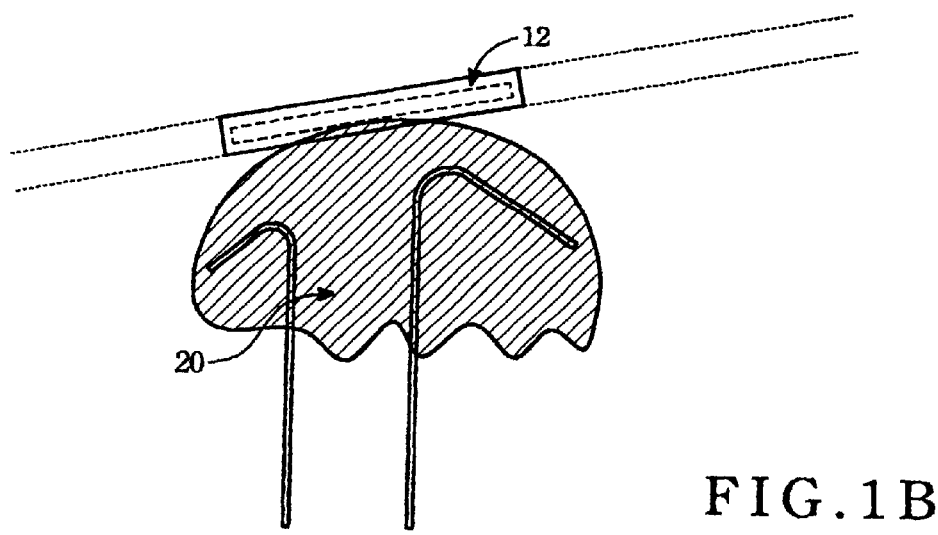
Figure 2:
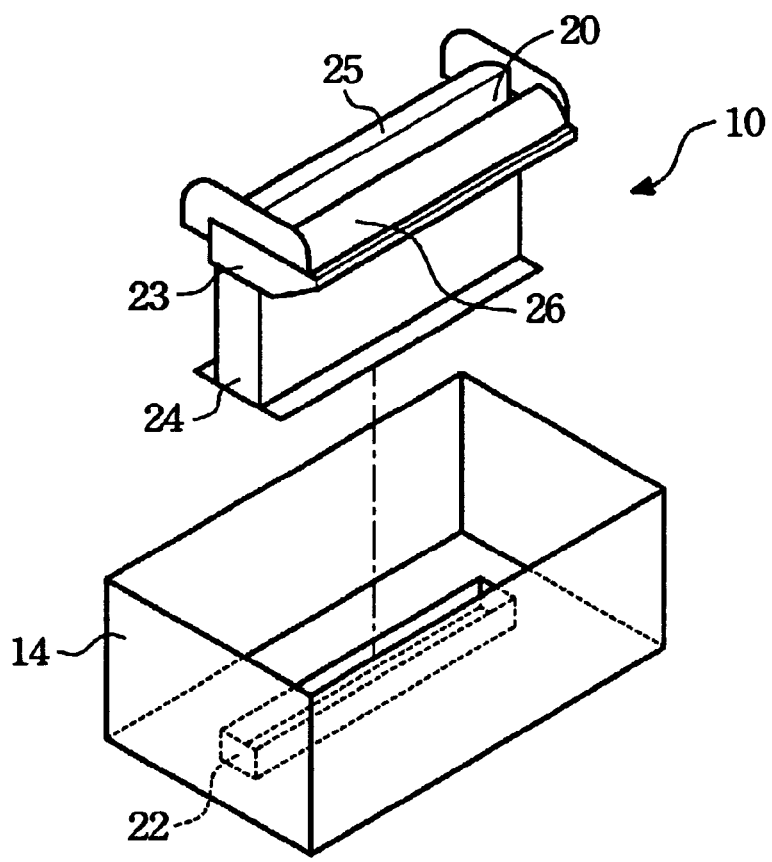
FIG. 2 is a schematic diagram of a nozzle of the stannic furnace in the prior art.
Figure 3A:
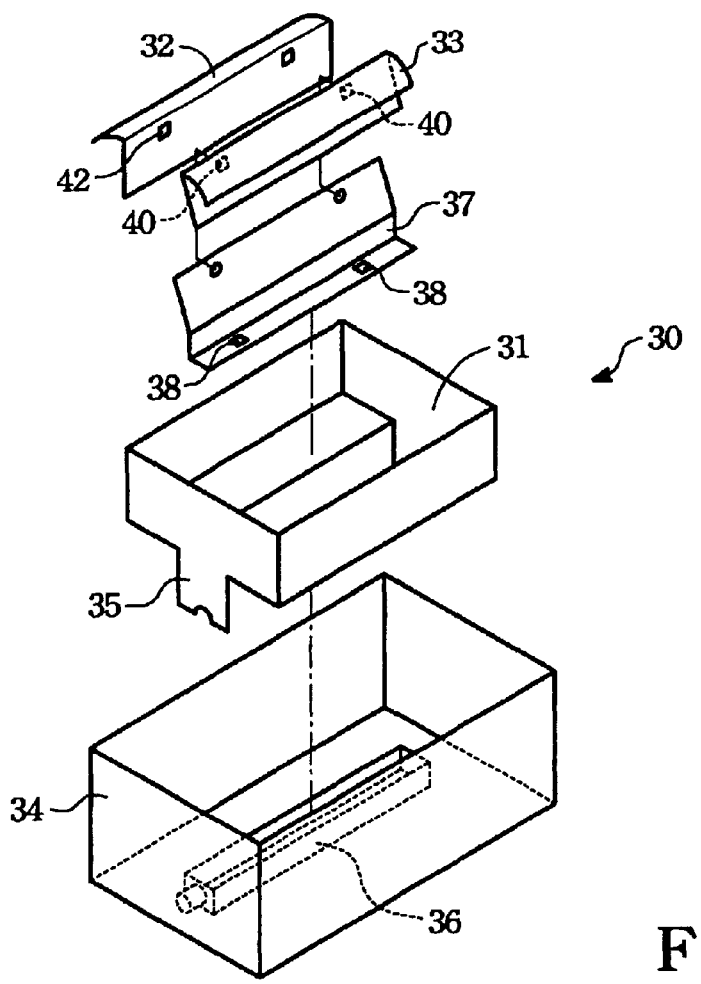
FIGS. 3A and 3B are schematic diagrams of an adjustable nozzle of a stannic furnace in accordance with the present invention.
Figure 3B:
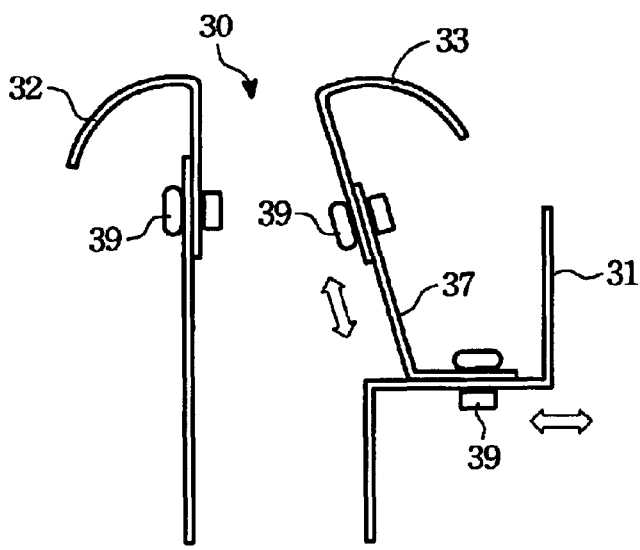

Please refer to FIGS. 3A and 3B, which are schematic diagrams of an adjustable nozzle 30 of the stannic furnace of this invention. The adjustable nozzle 30 comprises a nozzle tank 31, a front backflow stopper 32 and a rear backflow stopper 33. The nozzle tank 31 is a rectangular tank structure smaller than a stannic tank 34 of the stannic furnace. A lower guiding channel 35 at the base of the nozzle tank 31 can be linked up with the top of a nozzle pedestal 36 within the stannic tank 34 by a bottom dent at the lower guiding channel 35. A rear combining means 37, which is a bending plate structure is mounted on the backward area inside the base of the nozzle tank 31. The bottom portion of the bending plate is glidingly co-operated with the base of the nozzle tank 31 by means of horizontal openings 38 which are continuous long slots and can be used to adjust the horizontal position of the rear combining means 37 in relation to the base of the nozzle tank 31 and are fixed by a fixing means 39 (e.g. bolts or screws and so on). The upper portion of the bending plate is glidingly co-operated with the rear backflow stopper 33 by means of altitudinal openings 40 which are long slots upwardly slanting at a particular angle and can be used to adjust the altitudinal position of the rear combining means 37 in relation to the rear backflow stopper 33 and are fixed by the fixing means 39 (e.g. bolts or screws and so on). The front backflow stopper 32 is linked up to the forward area inside the nozzle tank 31 with front altitudinal openings 42. The front altitudinal openings 42 can be used to make a sliding combination of the front backflow stopper 32 and the nozzle tank 31, and a nozzle opening of the stannic furnace is formed between the front backflow stopper 32 and the rear backflow stopper 33. After being guided by the nozzle tank 31, the liquid tin within the stannic tank 34 produces a tin wave at the nozzle opening formed by the front and rear backflow stoppers 32, 33 so as to proceed with the tin soldering process.

Since the present invention can control the dimension of the nozzle opening by means of adjustment to the location of the rear combining means 37 in the horizontal direction, which adjustment drives the horizontal displacement of the rear backflow stopper 33, as well as can control the spouting angle and speed of the tin wave by means of adjustment to the relative altitude of the front and rear backflow stoppers 32, 33, an appropriate waveform of the tin wave will be produced to control the contacting period of the circuit board 12 with the tin wave and thus to enhance the quality of wave soldering for the circuit board.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed:

1. An adjustable nozzle of a stannic furnace, which nozzle is mounted at the upper portion of a stannic tank of said stannic furnace and guides a liquid tin within said stannic tank to produce a tin wave at an opening of said nozzle for tin soldering, said nozzle comprises:

a nozzle tank, wherein a lower guiding channel is mounted on the base thereof and guides said liquid tin within said stannic tank to said nozzle tank;

a front backflow stopper, which is mounted at the forward area inside said nozzle tank; and a rear backflow stopper, which is mounted at the backward area inside said nozzle tank and cooperates with said front backflow stopper to form said opening of said nozzle, wherein said liquid tin is spouted out from said opening of said nozzle to produce said tin wave; and is characterized in that:

said rear backflow stopper is mounted at the backward area inside said nozzle tank by means of a rear combining means which includes an altitudinal opening and a fixing means thereof, where said rear backflow stopper can be moved at said altitudinal opening to adjust the altitude thereof and be fixed by said fixing means so as to control the waveform of said tin wave produced by said nozzle of said stannic furnace.

2. The adjustable nozzle of the stannic furnace of claim 1, wherein said rear combining means further includes a horizontal opening and a fixing means thereof, whereby said rear combining means can be glidingly moved at said base of said nozzle tank via said horizontal opening to adjust the horizontal position of said rear combining means and be fixed by said fixing means so as to control the dimension of said opening of said nozzle of said stannic furnace.

3. The adjustable nozzle of the stannic furnace of claim 2, wherein said rear combining means is a bending plate structure, and said altitudinal opening and said horizontal opening are respectively formed at the upper portion and the lower portion of said bending plate structure.

4. The adjustable nozzle of the stannic furnace of claim 2, wherein said altitudinal opening and said horizontal opening are continuous long slots, and said fixing means thereof are bolts.

5. The adjustable nozzle of the stannic furnace of claim 1, wherein said altitudinal opening is a long slot which upwardly slants at a particular angle, thereby altering the altitudinal and horizontal position of said rear backflow stopper when said rear backflow stopper is moved at said altitudinal opening so as to control the waveform of said tin wave produced by said nozzle of said stannic furnace.

6. The adjustable nozzle of the stannic furnace of claim 1, wherein said front backflow stopper is mounted at the forward area inside said nozzle tank by a front altitudinal opening which is used to make a sliding combination of said front backflow stopper and said nozzle tank so as to control the waveform of said tin wave produced by said nozzle of said stannic furnace.

7. An adjustable nozzle of a stannic furnace, which nozzle is mounted at the upper portion of a stannic tank of said stannic furnace and guides a liquid tin within said stannic tank to produce a tin wave at an opening of said nozzle for tin soldering, said nozzle comprises:

a nozzle tank, wherein a lower guiding channel is mounted on the base thereof and guides said liquid tin within said stannic tank to said nozzle tank;

a front backflow stopper, which is mounted at the forward area inside said nozzle tank; and a rear backflow stopper, which is mounted at the backward area inside said nozzle tank and cooperates with said front backflow stopper to form said opening of said nozzle, wherein said liquid tin is spouted out from said opening of said nozzle to produce said tin wave; and is characterized in that:

said rear backflow stopper is mounted at the backward area inside said nozzle tank by means of a rear combining means which includes a horizontal opening and a fixing means thereof, where said rear combining means can be glidingly moved at said base of said nozzle tank via said horizontal opening to adjust the horizontal position of said rear combining means and be fixed by said fixing means so as to control the dimension of said opening of said nozzle and the waveform of said tin wave produced by said nozzle of said stannic furnace.

8. The adjustable nozzle of the stannic furnace of claim 7, wherein said rear combining means further includes an altitudinal opening and a fixing means thereof, whereby said rear backflow stopper can be moved at said altitudinal opening to adjust the altitude thereof and be fixed by said fixing means so as to control the dimension of said opening of said nozzle and the waveform of said tin wave produced by said nozzle of said stannic furnace.

9. The adjustable nozzle of the stannic furnace of claim 8, wherein said rear combining means is a bending plate structure, and said altitudinal opening and said horizontal opening are respectively formed at the upper portion and the lower portion of said bending plate structure.

10. The adjustable nozzle of the stannic furnace of claim 8, wherein said altitudinal opening and said horizontal opening are continuous long slots, and said fixing means thereof are bolts.

11. The adjustable nozzle of the stannic furnace of claim 8, wherein said altitudinal opening is a long sliding slot which upwardly slants at a particular angle, thereby altering the altitudinal and horizontal position of said rear backflow stopper when said rear backflow stopper is moved at said altitudinal opening so as to control the waveform of said tin wave produced by said nozzle of said stannic furnace.

12. The adjustable nozzle of the stannic furnace of claim 8, wherein said front backflow stopper is mounted at the forward area inside said nozzle tank by using a front altitudinal opening which is used to make a sliding combination of said front backflow stopper and said nozzle tank so as to control the waveform of said tin wave produced by said nozzle of said stannic furnace.

* * * * *